United States Patent [19]
Uchida

[11] Patent Number: 5,369,516
[45] Date of Patent: Nov. 29, 1994

[54] OPTICAL COMMUNICATION NETWORK SYSTEM AND COMMUNICATION METHOD USING THE SAME

[75] Inventor: Mamoru Uchida, Yokohama, Japan

[73] Assignee: Canon Kabushiki Kaisha, Tokyo, Japan

[21] Appl. No.: 116,559

[22] Filed: Sep. 7, 1993

Related U.S. Application Data

[63] Continuation of Ser. No. 686,378, Apr. 17, 1991, abandoned.

[30] Foreign Application Priority Data

Apr. 18, 1990 [JP] Japan .................................. 2-102358
Jul. 6, 1990 [JP] Japan .................................. 2-180195

[51] Int. Cl.⁵ ...................... H04B 10/20; H04J 14/02
[52] U.S. Cl. .................................. 359/125; 359/115; 359/118; 359/164; 359/167; 340/825.08
[58] Field of Search ............... 359/114, 115, 117, 118, 359/124, 125, 128, 137, 139, 152, 164, 126, 167; 340/825.05, 825.5

[56] References Cited

U.S. PATENT DOCUMENTS

| | | | |
|---|---|---|---|
| 4,236,243 | 11/1980 | Davies et al. ........................... | 370/3 |
| 4,592,043 | 5/1986 | Williams ................................. | 359/152 |
| 4,726,010 | 2/1988 | Ali et al. ................................. | 359/125 |
| 4,730,301 | 3/1988 | McMahon ............................... | 370/2 |
| 4,809,361 | 2/1989 | Okada et al. ............................ | 359/166 |
| 4,850,047 | 7/1989 | Iguchi et al. ............................ | 359/117 |
| 5,005,166 | 4/1991 | Suzuki et al. ........................... | 359/117 |
| 5,086,349 | 2/1992 | Okayama et al. ....................... | 359/124 |
| 5,305,134 | 4/1994 | Tsushima et al. ....................... | 359/124 |
| 5,321,540 | 6/1994 | Takai et al. ............................. | 359/124 |

FOREIGN PATENT DOCUMENTS

54363 6/1982 European Pat. Off. .

*Primary Examiner*—Richard E. Chilcot, Jr.
*Assistant Examiner*—Rafael Bacares
*Attorney, Agent, or Firm*—Fitzpatrick, Cella, Harper & Scinto

[57] ABSTRACT

An optical communication method and network system includes a base station for generating a plurality of beams having different wavelengths, an optical transmission line for transmitting the plurality of beams emitted by the base station, an optical transmitter, connected to the optical transmission line, for selecting one of the plurality of beams transmitted through the optical transmission line and modulating the selected beam in accordance with a signal to be transmitted, and an optical receiver, connected to the optical transmission line, for receiving the signal transmitted using the selected beam.

63 Claims, 7 Drawing Sheets

OPTICAL COMMUNICATION NETWORK SYSTEM AND COMMUNICATION METHOD USING THE SAME

This application is a continuation of application Ser. No. 07/686,378filed Apr. 17, 1991, now abandoned.

BACKGROUND OF THE INVENTION

1. Field of the Invention

The present invention relates to an optical communication network system such as an optical local area network (LAN) and a communication method using the same.

2. Related Background Art

In recent years, optical communication networks such as optical LANs have been remarkably developed. These networks must have compatibility with multi media in future applications. Wavelength multiplexing is most promising as a solution to this problem. Many problems are still left unsolved to realize a wavelength multiplexing LAN compatible with multi media.

First, when a system is to be constituted by terminal stations passive to light, attenuation is repeated by terminal stations, and the number of terminal stations connected to the system is limited to result in restriction to system extensibility.

Repeaters must be arranged in the system to prevent the attenuation. It becomes, however, more difficult to perform amplification by optoelectrical (O/E) conversion and electrooptical (E/O) conversion in units of channels as the degree of wavelength multiplexing is increased. In order to solve this problem, it is regarded as an effective method to use a wide-band optical amplifier for collectively amplifying signals on a plurality of channels.

In a wavelength multiplexing LAN, the input level of the optical amplifier greatly varies depending on the number of channels used for multi-access. It is, therefore, difficult to set the output level to a desired level.

Second, temperature stability of an oscillation wavelength of a semiconductor laser used as a light source is poor. In order to prevent an error rate decrease caused by crosstalk between channels, a channel separation range must be increased. As a result, semiconductor lasers corresponding to the number of channels and narrow-band stable wavelength filters (e.g., dielectric thin film interference filters and diffraction gratings) corresponding to the number of channels are required to constitute a light source, resulting in high cost and limitations the degree of wavelength multiplexing and hence failing to satisfy needs of users.

Third, in association with the second problem, there is provided a method of using a wavelength variable laser as a light source and a semiconductor wavelength variable filter as a filter to increase a degree of wavelength multiplexing. In order to assure the number of common channels for the respective terminal stations, high-precision temperature control is required for the semiconductor laser and the semiconductor wavelength variable filter, resulting in an expensive system.

SUMMARY OF THE INVENTION

It is an object of the present invention to solve the conventional problems described above and to provide an inexpensive, highly reliable optical communication network system and a communication method using the same.

In order to achieve the above object according to the first aspect of the present invention, there is provided an optical communication network system comprising:

a base station for generating a plurality of beams having different wavelengths;

an optical transmission line for transmitting the plurality of beams emitted by the base station;

an optical transmitter, connected to the optical transmission line, for selecting one of the plurality of beams transmitted through the optical transmission line and modulating the selected beam in accordance with a communication signal generated by a signal source of the optical communication network system to be transmitted; and an optical receiver, connected to the optical transmission line, for receiving the signal transmitted using the selected beam.

The optical transmitter used in the above system comprises:

an optical demultiplexing element for partially demultiplexing the plurality of beams from the optical transmission line;

a first wavelength variable filter for selectively extracting a beam having an arbitrary wavelength from the beams demultiplexed by the optical demultiplexing element;

a photosensor for detecting the beam extracted by the first wavelength variable filter;

a second wavelength variable filter connected to the optical transmission line for separating a beam having an arbitrary wavelength from other beams of the plurality of beams and extracting the separated beam from the optical transmission line;

an optical modulator for modulating the beam separated by the second wavelength variable filter, in accordance with a communication signal generated by a signal source of the optical communication network system to be transmitted; and an optical multiplexing element for multiplexing the beam modulated by the optical modulator and transmitting multiplexed light through the optical transmission line.

There is also provided a method of performing communication using the above optical communication network system, comprising the steps of:

selecting a beam of a plurality of beams received by an optical receiver of a first one of terminal stations, the selected beam being not used in other terminal stations;

modulating the beam selected by the optical receiver of the first terminal station, in accordance with a communication signal generated by a signal source of the optical communication network to be transmitted; and detecting the selected beam by an optical receiver of a second one of the plurality of terminal stations and receiving a signal transmitted from the first terminal station, According to a second aspect of the present invention, there is provided an optical communication network system comprising:

an optical transmission line;

a base station, connected to the optical transmission line, for transmitting at least one reference beam having a predetermined wavelength through the optical transmission line;

an optical transmitter, connected to the optical transmission line, for transmitting, through the optical transmission line, a communication signal generated by a signal source of the optical communication network beam having a wavelength different from that of the reference beam and modulated in accordance with a signal to be transmitted, the optical transmitter being provided with means for detecting the reference beam and controlling the wavelength of the signal beam on the basis of the wavelength of the detected reference beam; and an optical receiver, connected to the optical transmission line, for receiving the signal beam transmitted from the optical transmitter through the optical transmission line.

The optical transmitter/receiver used in the second aspect of the present invention comprises:

a light source for transmitting, through the optical transmission line, a signal beam having a wavelength different from that of the reference beam and modulated in accordance with communication signal generated by a signal source of the optical transmitter/receiver to be transmitted;

means for detecting the reference beam; and means for controlling a wavelength of the signal beam emitted from the light source, on the basis of the wavelength of the detected reference light.

There is also provided a method of performing communication using the optical transmitter/receiver, comprising the steps of:

detecting a reference beam transmitted from a base station by detecting means in the optical transmitter/receiver;

transmitting, from the light source to the optical transmission line, a signal beam having a wavelength different from that of the reference beam and modulated in accordance with the signal to be transmitted; and controlling a wavelength of the signal from the light source by the control means on the basis of the wavelength of the detected reference beam.

DETAILED DESCRIPTION OF THE PREFERRED EMBODIMENTS

Figure 1:
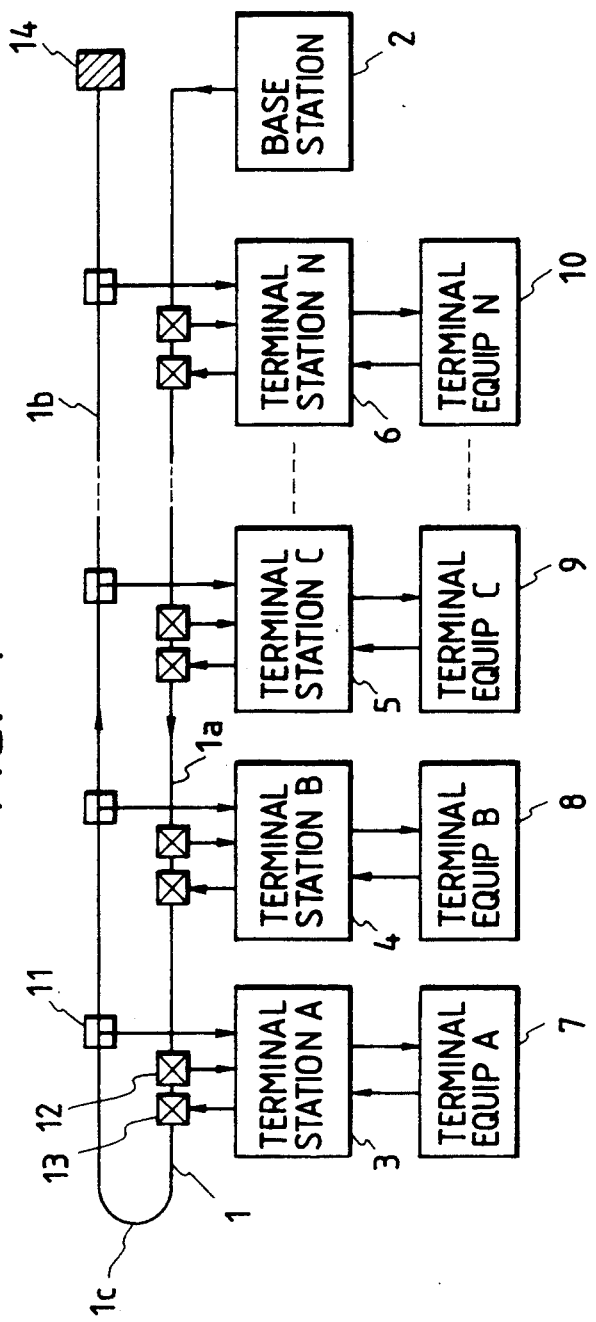
FIG. 1 is a block diagram showing the first embodiment of an optical communication network system according to the present invention.

FIG. 1 shows an arrangement of the first embodiment of an optical communication network system according to the present invention. The optical communication network system comprises an optical fiber transmission line 1 having a U-shaped bus, a sending line 1a, a receiving line 1b, and a transmission line folding point 1c. A base station 2 is connected to one end of the transmission line 1, and a plurality of normal terminal stations 3 to 6 are arranged along the transmission line 1. Terminal equipments 7 to 10 are connected to the terminal stations 3 to 6, respectively, to perform signal transmission or reception. Optical demultiplexing elements 11 are arranged along the receiving line 1b. Optical switches 12 and 13 are arranged along the sending line 1a. The transmission line 1 has a terminal end 14.

The base station 2 will be described first. The base station 2 is a sole light source in this optical communication system. The base station 2 simultaneously outputs continuous beams having different wavelengths subjected to wavelength multiplexing to the sending and receiving lines 1a and 1b. For example, a wide-band multi-mode semiconductor laser (to be referred to as a wide-band LD hereinafter) is suitable as a light source (not shown) of this base station 2.

The light source may comprise a semiconductor laser having an active layer consisting of an asymmetrical quantum-well structure, i.e., a quantum-well structure of well layers having different band gaps, or a light-emitting layer having the same structure. These light sources can provide a wider gain spectrum than that of an element having a bulk active layer. By selecting an end face reflectance of a device, a Faby-Perot mode having a wavelength interval corresponding to a resonator length appears in the light emission spectrum, and this mode can be used as a wavelength multiplexing light source. For example, when a resonator length is given as 300 μm and a center frequency is given as 0.83 μm, the wavelength interval, i.e., a channel interval becomes about 0.3 nm. By appropriately biasing the wide-band LD, a continuous wave having several tens of wavelengths and almost equal output levels (wavelengths are defined as $\lambda_1, \lambda_2, \ldots \lambda_n$) can be always output.

Figure 2:
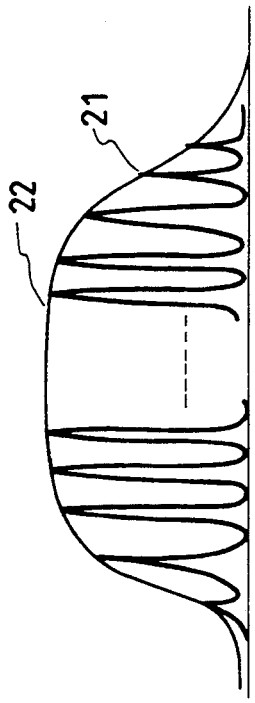
FIG. 2 is a graph showing an optical spectrum used in the first embodiment.

A light emission spectrum of this wide-band LD is shown in FIG. 2. The spectrum has an axial (longitudinal) mode 21 which has an envelope 22. The number of channels can be arbitrarily changed in accordance with changes in parameters of the asymmetrical quantum-well structure, i.e., a well depth, a well thickness, a barrier height, a barrier thickness, and the like. The wavelength interval can be arbitrarily set in accordance with changes in resonator length. The optical output level can be arbitrarily set in accordance with changes in bias levels applied to the device and end face reflectances.

The above description has been concerned with generation of a continuous wave having a plurality of wavelengths by a single element. However, separate light-emitting elements may be prepared in units of channels (wavelengths). In either case, in order to stabilize the wavelengths of the respective channels and optical outputs, a temperature control unit is required for the light-emitting elements. When the former case is employed, i.e., when a plurality of channels are obtained from a single element, temperature controllability of ±0.1° C. is sufficient, resulting in an inexpensive light source unit in the base station 2. On the other hand, when the latter case is employed, i.e., when separate light-emitting elements are arranged in units of channels, the resultant system becomes more expensive than that in the former case. However, the latter case has an advantage in that the channel interval and the optical output can be freely set.

Figure 3:
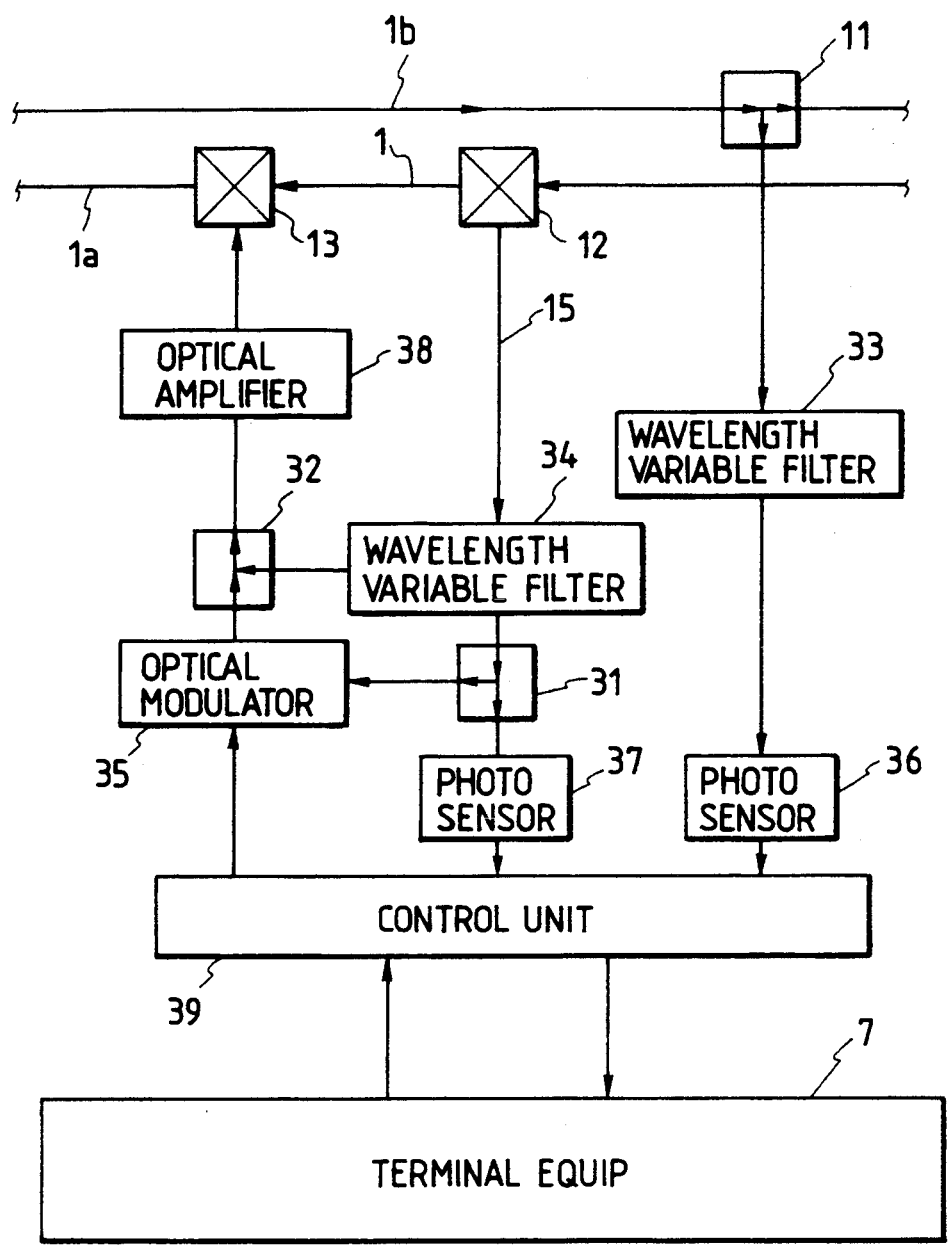
FIG. 3 is a block diagram showing an arrangement of an optical transmitter/receiver used in the first embodiment.

The normal terminal stations 3 to 6 will be described. FIG. 3 shows an arrangement of a normal terminal station (to be referred to as the terminal station 3 hereinafter). The arrangement in FIG. 3 includes an optical demultiplexing element 31, an optical multiplexing element 32, and optical switches 12 and 13 operated to switch the beam on the sending line 1a between the sending line 1a (optical line 1) and the terminal station side (optical line 15), and the beam on the terminal station side or the optical line 1 side to the sending line 1a. The terminal station 3 includes wavelength variable filters 33 and 34, an optical modulator 35, photosensors 36 and 37, an optical amplifier 38, and a control unit 39 for controlling optical line selection of the optical switches 12 and 13, and wavelength selection of the wavelength variable filters 33 and 34, and performing gain control of the optical amplifier 38 and control of an overall communication protocol.

In the above arrangement, assume that data is transmitted from a terminal station A3 to a terminal station B4 in FIG. 1. In the terminal station A3, a beam wavelength-multiplexed on the downstream reception line 1 is further demultiplexed by the optical multiplexing element 11 into the downstream transmission line 1 side and the terminal station 3 side. The wavelength variable filter 33 selects only a beam having an arbitrary wavelength (e.g., $\lambda_1$) from beams (wavelengths $\lambda_1, \lambda_2, \ldots \lambda_n$) demultiplexed onto the terminal station 3 side. A method of wavelength selection is performed in practice. Channels are continuously scanned by the wavelength variable filter 33, and optical outputs of transmitted beams are monitored by the photosensor 36 to recognize a busy state of each channel in accordance with whether signals are superposed or not.

The wavelength variable filter 33 having the above function is a distribution feedback (DFB) transmission filter having a semiconductor structure similar to the wide-band LD used in the base station 2.

When the channel having the wavelength $\lambda_1$ is recognized to be free, the control unit 39 in the terminal station A3 controls the optical switch 12 to switch the beam on the sending line 1a to the terminal station A3 side. The optical switch 12 comprises a fail-safe switch normally connected to the transmission line 1 side. The switched beam is demultiplexed by the wavelength variable filter 34 into a beam having the same wavelength as that ($\lambda_1$) recognized by the wavelength variable filter 33 as an empty channel upon wavelength sweeping and beams having other wavelengths.

The wavelength variable filter 34 has a structure complying with the wavelength variable filter 33.

The separated beam having the wavelength $\lambda_1$ is demultiplexed into two directions by the optical demultiplexing elements 31. A beam in one direction is input to the photosensor 37, so that its light intensity and phase are monitored. A beam in the other direction is superposed on data from the terminal equipment 7 through the control unit 39 by means of the optical modulator 35. In this case, a preferable modulation method is a modulation method which inhibits a change in optical output, e.g., a frequency modulation (FM) method or a phase modulation (PM) method. However, a normal amplitude (of intensity) modulation (AM) method may be used. The modulated beam (wavelength: $\lambda_1$) is multiplexed with the beams having wavelengths other than the wavelength $\lambda_1$.

At this time, when FM or PM modulation is employed and the amount of light of the modulated optical signal input to the optical multiplexing element 32 is set to have an optical level equal to that of the beam of wavelengths (except for the wavelength $\lambda_1$) input from the wavelength variable filter 34 to the optical multiplexing element 32, the intensities of beams having the respective wavelengths can be kept constant regardless of access states of the terminal stations except for the terminal station A3.

When AM modulation is employed, the optical output instantaneously varies. However, when a coding scheme having a mark ratio (DC components) of 50% (e.g., a Manchester coding scheme) is selected, a time average of an output level at an arbitrary time can be controlled to be always 50% of that obtained by FM or PM modulation. Therefore, if a gain of 3 dB is given to the optical modulator 35 under the control of the control unit 39, the output levels of respective wavelengths input to the optical amplifier 38 can be kept constant.

The beams of the respective wavelengths simultaneously amplified by the amplifier 38 are controlled by the control unit 39 and are sent to the sending line 1a through the optical switch 13.

On the other hand, when data is to be received by the terminal station B4, a beam on the receiving line 1b is demultiplexed by the optical demultiplexing element 11 in the terminal station B4, and a desired wavelength is selected by the wavelength variable filter 33. The selected signal is received by the photosensor 36. In this case, the wavelength variable filter 33 is controlled by the control unit 39 so as to selectively extract the beam having the wavelength $\lambda_1$. A signal superposed on the beam having the wavelength $\lambda_1$ by the terminal station A3 is received by the terminal station B4.

A selection wavelength of the wavelength variable filter 33 is set to $\lambda_1$ as follows. For example, when a signal is to be superposed on a beam having a wavelength $\lambda_1$ in the terminal station A3, header information serving as a signal representing the terminal station B4 as a destination is added to the start of the transmission format at the time of superposition of the signal on this beam, and the superposed signal is found upon wavelength sweeping in the wavelength variable filter 33 in the terminal station B4. The selection wavelength of the filter 33 is fixed to a wavelength at which the signal with the index header is superposed.

At this time, the optical switch 12 of the terminal station B4 is set on the optical line 1 side, and a beam on the sending line 1a passes only through the terminal station B4. That is, the terminal station B4 serves only as a receiving station. However, it is possible to transmit a signal through another channel while input data is being received. For this purpose, an empty carrier or channel found upon wavelength sweeping is found by the wavelength variable filter 33, and a transmission operation may be performed on the transmission side including the optical modulator 35 by using this carrier. This control is performed by the control unit 39, and the communication protocol is the same as transmission in the terminal station A3.

Since the normal terminal stations 3 to 6 of this embodiment have all the normal passive terminal station functions when viewed from the user side, a normal communication protocol or access scheme such as carrier sense multiple access with collision detection (CSMA/CD) can be used almost without any modifications.

If a repeater is required for system extension or the like, an optical amplifier as a repeater may be arranged at an arbitrary position of the transmission line.

In this embodiment described above, temperature control may be basically assigned to only the base station since only the light source is the base station, thus providing an inexpensive wavelength multiplexing optical communication network. Since the input signal levels of the optical amplifiers of the optical transmitters/receivers are set to be equal to each other for all the channels, all the wavelengths can be amplified with a given gain, thus facilitating level adjustment to obtain a simple system. A drawback of a conventional bus type network, i.e., a limitation in the number of terminal stations, can be eliminated.

Figure 4:
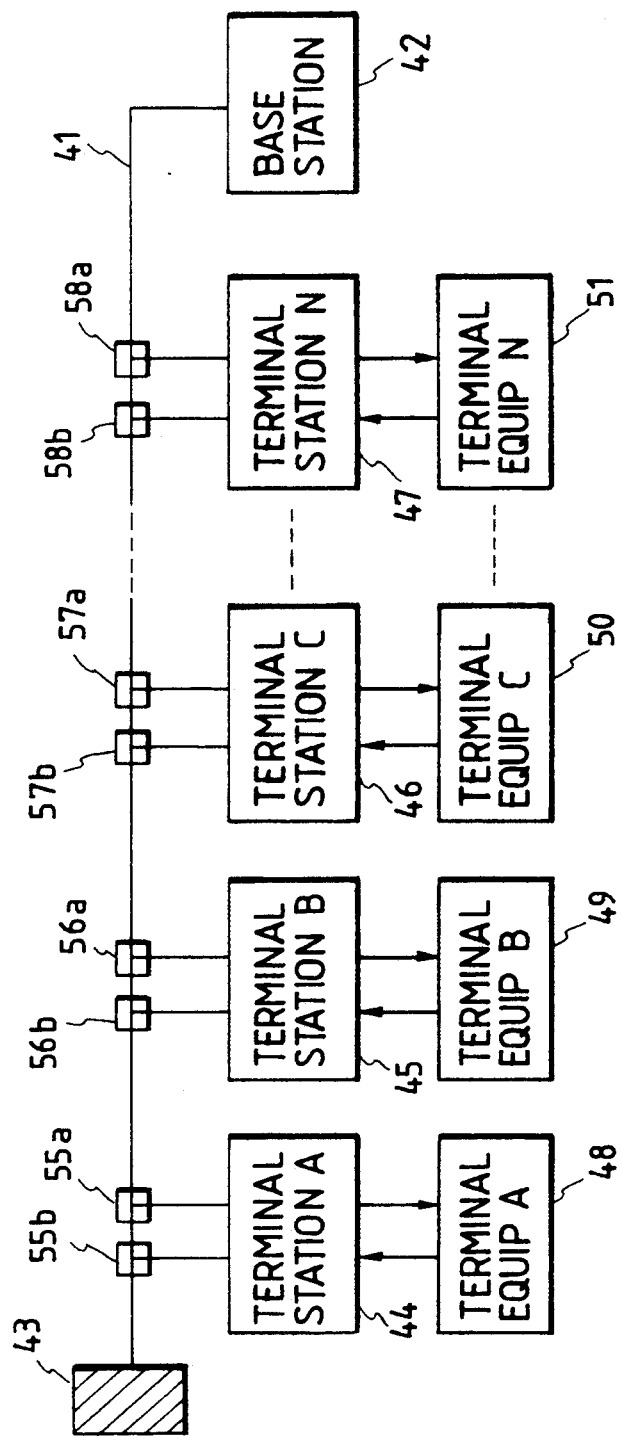
Fig. 4 is a block diagram showing the second embodiment of an optical communication network system according to the present invention.

FIG. 4 shows an arrangement of the second embodiment of an optical communication network system according to the present invention. This communication network system includes an optical fiber transmission line 41 having a bus shape, a base station 42 connected to one end of this transmission line 41, a terminal end 43 connected to the other end of the transmission line 41, a plurality normal terminal stations 44 to 47 arranged along the transmission line 41, terminal equipments 48 to 51 respectively connected to the terminal stations 44 to 47 to perform signal transmission or reception, and optical demultiplexers/multiplexers 55a, 55b, ... 58a, and 58b arranged along the transmission line 41.

The base station 42 will be described first. The base station always outputs at least one continuous reference beam onto the optical fiber transmission line 1. The reference beam is defined as a beam having a predetermined intensity or a beam modulated by a specific signal so as to distinguish it from other beams. Since the light source for extracting this reference beam serves as a reference light source of the system, a temperature control unit (not shown) for stabilizing the wavelength and optical output of only the base station 42 is required.

Figure 5:
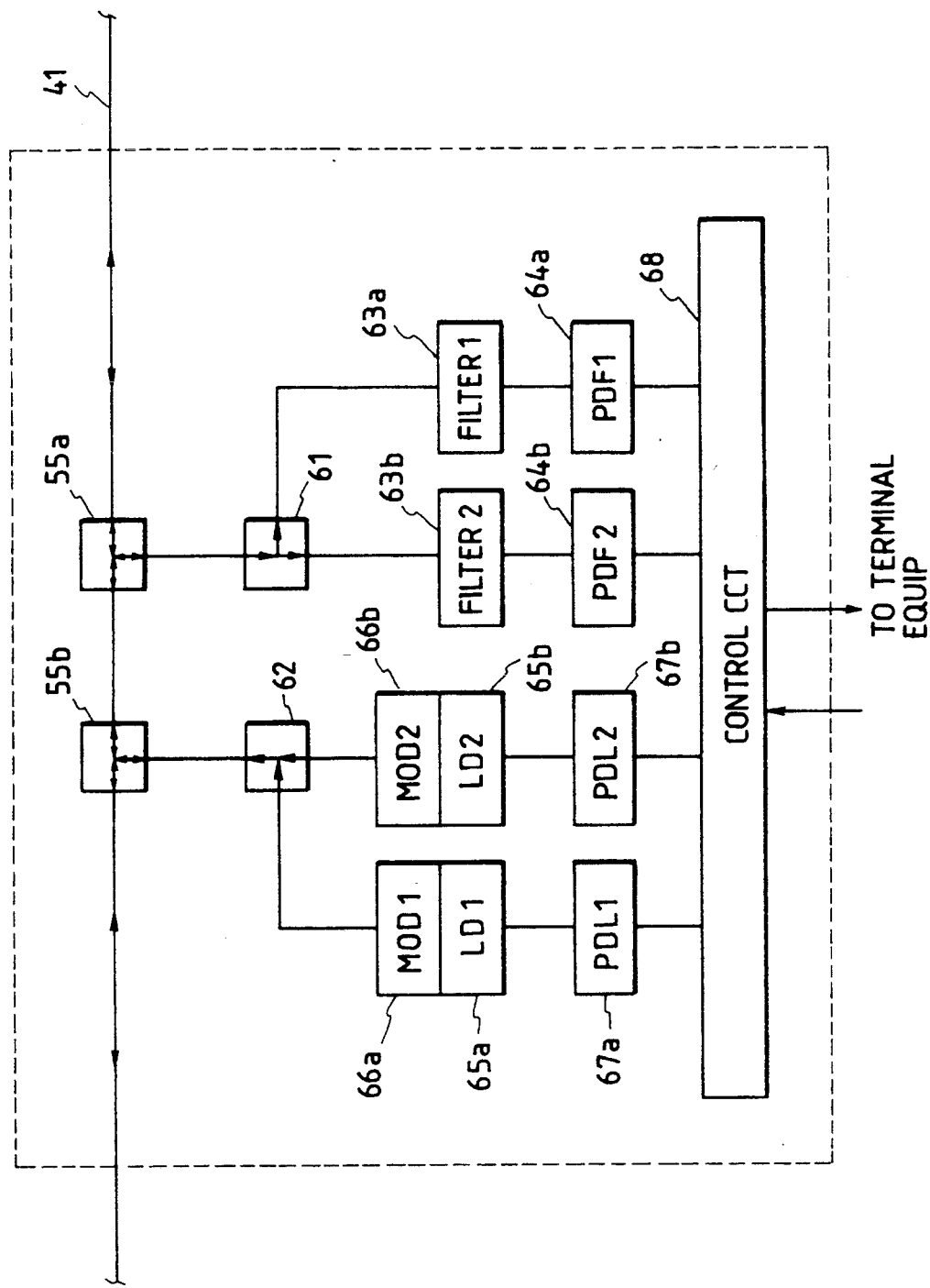
FIG. 5 is a block diagram showing an arrangement of an optical transmitter/receiver used in the second embodiment.

The normal terminal stations 44 to 47 will be described below. FIG. 5 shows an arrangement of a normal terminal station (to be referred as a terminal station A44) in this embodiment.

The three-way multiplexers/demultiplexers 55a and 55b are connected to the transmission line 41. The terminal station A44 includes a demultiplexing element 61, a multiplexing element 62, first and second wavelength variable semiconductor filters 63a and 63b, first and second photosensors (to be referred to as first and second PDFs hereinafter) 64a and 64b, first and second wavelength variable laser diodes (LDs) 65a and 65b, first and second optical modulators 66a and 66b, first and second monitor photosensors (to be referred to as first and second PDLs hereinafter) 67a and 67b for monitoring outputs from the first and second LPDs 65a and 65b, respectively, and a control circuit 68 for performing control of the above devices and an overall communication protocol.

In this embodiment, the first and second filters 63a and 63b and the first and second LDs 65a and 65b are suitably constituted by carrier injection type multielectrode distribution feedback (DFB) semiconductor elements.

Figure 6:
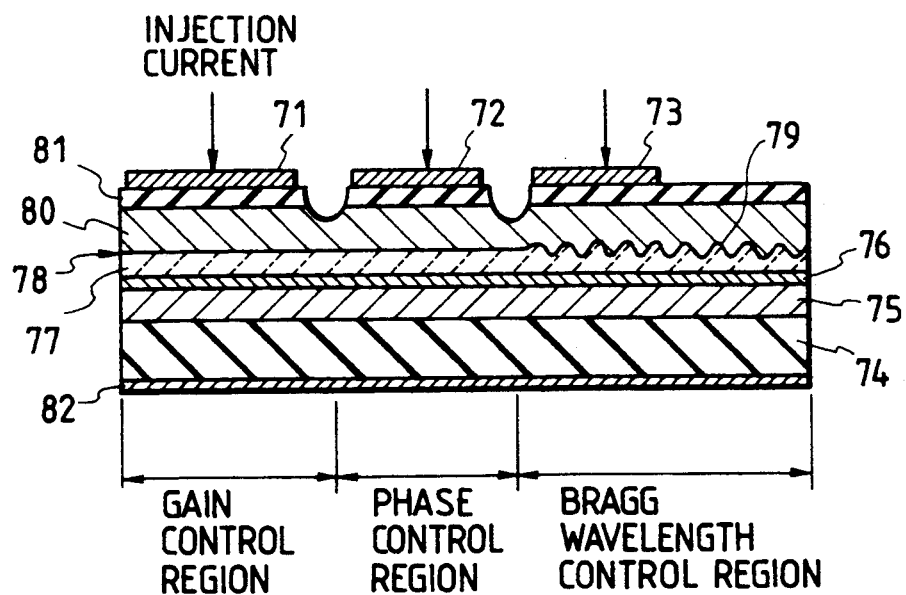
FIG. 6 is a schematic sectional view showing an arrangement of a distribution feedback semiconductor element suitably used as a laser diode of the second embodiment.

FIG. 6 is a schematic sectional view showing a structure of the above DFB laser diode. Referring to FIG. 6, a first cladding layer 75, an active layer 76, a light guide layer 77, a second cladding layer 80, and a capping layer 81 are sequentially stacked on a substrate 74. These layers are made of, e.g., GaAs or AlGaAs. The stacked semiconductor layers are divided into a gain control region, a phase control region, and a Bragg wavelength control region in the resonance direction. Grooves are formed in the second cladding layer 80 and the capping layer 81 at boundaries between these regions, thereby isolating these regions from each other. Electrodes 71, 72, and 73 are formed on the capping layer 81 in the divided regions, respectively. A grating 79 is formed at the boundary between the light guide layer 77 and the second cladding layer in the Bragg wavelength control region. This grating constitutes an end face 78 formed by cleavage and also constitutes a laser resonator.

In the above laser diode, current amounts or voltage values injected from the electrodes 71, 72, and 73 are independently controlled to control the intensities and wavelengths of laser beams emitted from this laser diode. The structure of this laser diode can be applied to the wavelength variable semiconductor optical filter. When this laser diode is applied as a filter, current amounts or voltage values applied from the respective electrodes are regulated or adjusted to control the gain and transmission wavelength range of this filter. In this laser diode and optical filter, almost a linear relationship is established between the control signals, i.e., current amounts and voltage values, and the operating wavelength, i.e., a light emission wavelength or transmission wave range. Even if the operating wavelength varies depending on variations in external environments, the operating wavelength can be easily controlled to a desired value again if a control signal corresponding to a given wavelength is known. That is, by using these devices, a wavelength for data communication can be arbitrarily set on the basis of the reference light having a desired wavelength.

If the filters 63a and 63b and the LDs 65a and 65b have the same structure and characteristics and if a control signal corresponding to a given wavelength or a pass band in one of these devices is known, control signals for setting desired wavelengths or channels for all other devices can be known.

Figure 7:
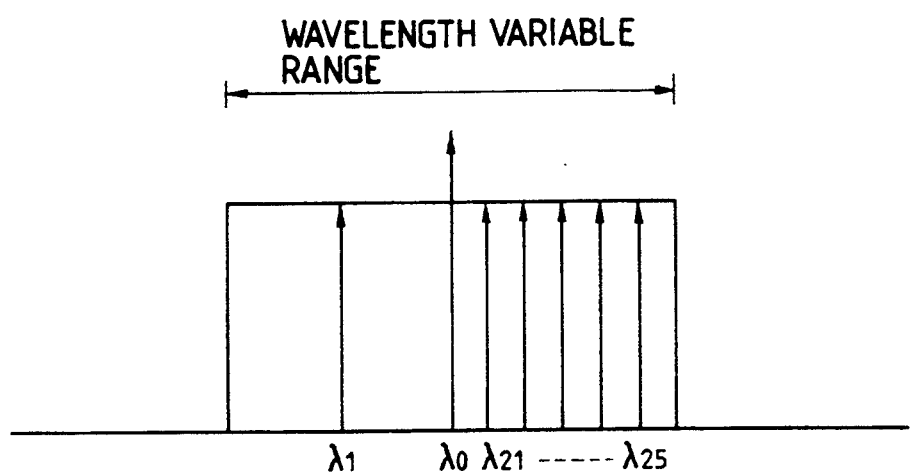
FIG. 7 is a graph showing wavelengths of reference and signal beams used in the second embodiment.

FIG. 7 shows wavelengths of beams from the base station 42 and the normal terminal stations 44 to 47. The base station 42 has a reference wavelength $\lambda_0$. The first LD 65a has an oscillation wavelength $\lambda_1$. The second LD 65b has oscillation wavelengths $\lambda_{21}$ to $\lambda_{25}$. In this case, although the oscillation wavelength of the first LD 65a is fixed to $\lambda_1$, it is possible to variably set the wavelength of the second LD 65b.

With the above arrangement, an operation for transmitting data from the terminal station A44 to the terminal station B45 in FIG. 4 will be described below. A beam received by the terminal station A44 through the optical fiber transmission line 41 is demultiplexed by the optical demultiplexer/multiplexer 55a into a beam propagating straight through the optical fiber transmission line 41 and a beam received by a reception unit constituted by the filters 63a and 63b. The beam received by the reception unit is further demultiplexed into a plurality of beams (two beams in this case) by the optical demultiplexing element 61. The first and second filters 63a and 63b are respectively arranged along the optical paths of the demultiplexed beams. The control signal is changed to sweep the first filter 63a, and the beam transmitted through the first filter 63a is received by the first PDF 64a to select the reference beam (wavelength: $\lambda_0$; channel: 0) from the base station 62. At this time, the reference beam is discriminated in accordance with its intensity, a modulation mode, and the like. At this time, the control signal for this first filter 63a is stored in a control circuit.

A predetermined control signal may not always be able to control the filter 63a or the like due to deterioration of environmental conditions and conditions of the normal terminal station A44. For example, a desired selection wavelength may not always be filtered through the filter 63a. However, upon reception of a reference light having a known wavelength, the first filter 63a or the like obtains a reference point of a control signal for changing a pass band. In this manner, the first filter 63a can be set to have a desired channel on the basis of the control signal representing channel 0 (wavelength: $\lambda_0$).

The second filter 63b can select an arbitrary channel in accordance with the same technique as in the first filter 63a. As a result of channel sweeping, for example, assume that channel 23 (wavelength: $\lambda_{23}$) is detected not to be busy and that information is transmitted from the terminal station A44 to the terminal station B45. For this reason, the second LD 65b serving as a light source is controlled by an appropriate control signal derived on the basis of a control current or voltage for the first filter 63a, and a beam having a wavelength $\lambda_{23}$ is output. The output beam is supplied to a reception unit including the optical fiber transmission line 41 for transmitting an optical signal in both directions and the filter 63a by the optical demultiplexers/multiplexers 55b and 55a. The oscillation wavelength of the second LD 65b is monitored by the filter 63a or 63b. After the wavelength $\lambda_{23}$ is confirmed by this monitoring, a data signal from a terminal equipment is superposed on a carrier beam from the second LD by the second modulator 66b. The resultant beam is transmitted onto the optical fiber transmission line 41 in both directions through the multiplexer element 62 and the demultiplexer/multiplexer 55b.

At this time, in order to send a plurality pieces of information, the first LD 65a is also controlled as in the first filter 63a on the basis of the control signal for the first filter 63a, thereby setting the oscillation wavelength to $\lambda_1$ (channel 1). Similarly, after the wavelength $\lambda_1$ is confirmed by the filter 63a or 63b, information is superposed on the carrier beam by the first modulator 66a. The resultant signal is multiplexed with the beam from the second LD 65b through the multiplexing element 62. A plurality of pieces of information can be transmitted onto the optical fiber transmission line 41 by the demultiplexer/multiplexer 55b in both directions.

At this time, part of the output beam is input to the filter 63a or 63b by the demultiplexing/multiplexing element 55a and the demultiplexing element 61. The wavelength is monitored to perform wavelength tracking. When an oscillation wavelength from the LD 65a or 65b is even slightly deviated from the predetermined wavelength, a control signal may be adjusted to shift the oscillation wavelength to the predetermined wavelength. Alternatively, wavelength tracking may be performed by using the PDLs 67a and 67b for monitoring optical outputs from the LDs 65a and 65b.

A modulation method may be an amplitude (of intensity) modulation (AM) method, a frequency modulation (FM) method, a phase modulation (PM) method, or the like.

An operation for receiving data from the terminal station A44 to the terminal station B45 will be described below.

In the terminal station B45, of all the beams guided to the reception unit through the demultiplexer/multiplexer 55a, information to be sent to the terminal station B45 is received by the PDF 64a or 64b upon wavelength sweeping of the filter 63a or 63b, and the received information is demodulated in accordance with the corresponding modulation scheme, thereby reading the information content. Whether the information is sent to the terminal station B45 or not is determined by reading the header information added to the reception signal. Retransmission is required depending on the reception content. By the above protocol, it is possible to simultaneously transmit a plurality of pieces of information by using a plurality of channels. In a terminal station not associated with communication, the beam is demultiplexed by the demultiplexer/multiplexer 55a and is input to the reception unit, and its part is transmitted through this terminal station. Therefore, this terminal station serves as a passive terminal station.

Figure 8:
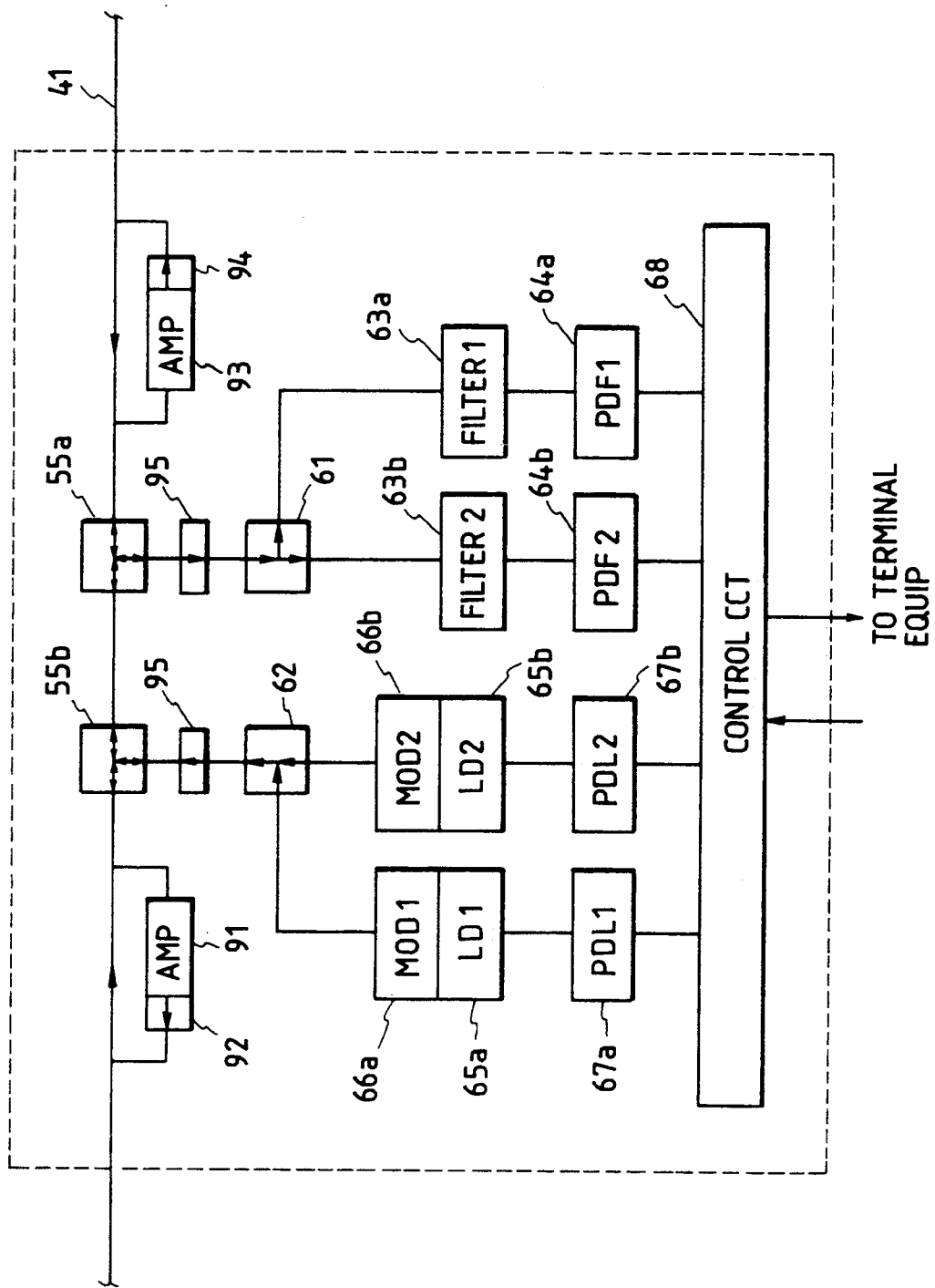
FIG. 8 is a block diagram showing another arrangement of an optical transmitter/receiver used in the second embodiment.

FIG. 8 shows the second embodiment of a transmitter/receiver of a terminal station. This transmitter/receiver includes traveling wave optical amplifiers 91 and 93 and optical isolators 92, 94, and 95. Other elements in FIG. 8 are identical to those in FIG. 5. In the first embodiment of FIG. 5, a transmission distance and the number of terminal equipments may be limited by a transmission loss and a demultiplexing loss. In this embodiment, the optical amplifiers 91 and 93 are arranged to compensate for output levels. The optical isolators 92, 94, and 95 are arranged to protect the optical amplifiers 91 and 93 from reflection at the reflection end of the transmission line 41 and the reflection ends of the devices of the terminal stations 44 to 47.

The optical amplifiers 91 and 93 are suitably constituted by semiconductor optical amplifiers or optical fiber amplifiers having almost a uniform gain throughout a relatively wide range suitable for wavelength multiplexing optical communication.

Figure 9:
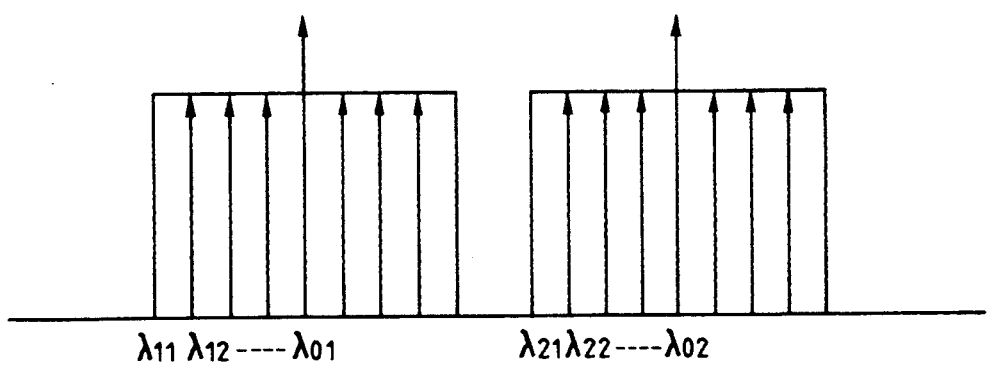
FIGS. 9 and 10 are graphs showing wavelengths of other reference and signal beams used in the second embodiment.

FIG. 9 shows another spectral range of beams from light sources of the base station 42 and the normal terminal stations 44 to 47. In this case, the base station 42 outputs reference beams having two different wavelengths (wavelengths: $\lambda_{01}$ and $\lambda_{02}$). Each terminal station can adjust the wavelengths and outputs of the filters 63a and 63b and the LDs 65a and 65b independently referring to the reference beams. More specifically, each of the filters 63a and 63b finds a control signal as a reference signal with reference to a reference beam and determines channel allocation on the basis of the control signal. For this reason, it is possible to operate two independent optical networks on a single system, and crosstalk between different optical networks can be satisfactorily prevented. This arrangement is effectively used to achieve confidentiality of communication.

Figure 10:
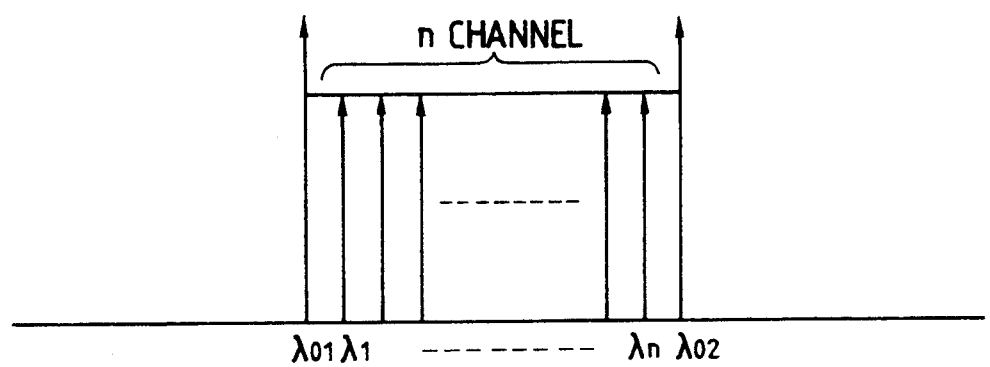

FIG. 10 shows still another range of beams emitted from light sources from the base station 42 and the normal terminal stations 44 to 47. In this case, the base station 42 also outputs reference beams having different wavelengths (wavelengths: $\lambda_{01}$ and $\lambda_{02}$). Each of the terminal stations 44 to 47 adjusts wavelengths and outputs of the filters 63a and 63b and the LDs 65a and 65b with reference to the two reference beams. In this case, the arrangement is associated with control in a single optical network. That is, the filter 63a or 63b of the reception unit scans two wavelengths and accurately detects a wavelength control current or voltage by using the two reference points. FIG. 10 illustrates a case when n channels are used. An advantage of this system lies in that device wavelength control can be very accurately performed with reference the two reference wavelengths even if characteristic variations occur in the wavelength variable laser and the wavelength variable filter.

Since the normal terminal stations 44 to 47 of this embodiment have all the normal passive terminal station functions and an active means when viewed from the user needs, a variety of communication operations compatible with multi media can be performed. A conventional communication or access scheme such as CSMA/CD can be directly used to facilitate system design.

In the above embodiment, since the reference beams are always output, the temperature control means can be basically arranged in only the base station to obtain an inexpensive wavelength multiplexing optical communication system. A plurality of receiving means such as wavelength variable filters and a plurality of transmitting means such as wavelength variable LDs can be independently operated. Therefore, a variety of communication operations such as simultaneous transmission or reception of a plurality of data can be performed. At this time, an operating wavelength can be easily set with reference to one or a plurality of reference wavelengths.

In addition, an optical repeater can be arranged at an arbitrary position along a transmission line, thereby improving system extensibility.

The present invention is used in a variety of applications in addition to the above embodiments. For example, in the above embodiments, a beam having a wavelength of about 0.8 µm is used in communication. However, the present invention is applicable to a system using a beam having a wavelength of 1.3 µm or 1.5 µm or in other wavelength ranges. The present invention incorporates the above applications without departing from the scope of the appended claims.

What is claimed is:

1. An optical communication network system comprising:
    a base station for simultaneously generating a plurality of continuous beams having different wavelengths;
    an optical transmission line for transmitting the plurality of beams emitted by said base station;
    a signal source for generating a communication signal;
    an optical transmitter, connected to said optical transmission line and said signal source, said optical transmitter including wavelength selection means for selecting a light beam of an arbitrary wavelength among the plurality of light beams transmitted by said optical transmission line and a light beam modulator for modulating the light beam selected by said wavelength selection means in accordance with the communication signal generated by said signal source and multiplexing means for multiplexing the light beam modulated by said light beam modulator to said optical transmission line; and
    an optical receiver, connected to said optical transmission line, for receiving the communication signal transmitted by the light beam modulated by said light beam modulator.

2. A system according to claim 1, wherein said optical transmission line comprises a sending line and a receiving line provided parallel with each other and connected to each other at a folding point of the transmission line, and wherein the beams transmitted in a predetermined direction in the sending line are inputted into the receiving line at the folding point to be transmitted in a direction opposite to said predetermined direction in the receiving line, and said base station and said optical transmitter are connected to the sending line, and said optical receiver is connected to the receiving line.

3. An optical communication network system, comprising:
    a base station for simultaneously generating a plurality of continuous beams having different wavelengths;
    an optical transmission line for transmitting the plurality of beams emitted by said base station; and
    a plurality of terminal stations connected to said optical transmission line, each of said plurality of terminal stations being provided with:
    a signal source for generating a communication signal;
    an optical transmitter connected to said signal source, said optical transmitter including wavelength selection means for selecting a light beam of an arbitrary wavelength among the plurality of light beams transmitted by said optical transmission line, a light beam modulator for modulating the light beam selected by said wavelength selection means in accordance with the communication signal generated by said signal source, and multiplexing means for multiplexing the light beam modulated by said light modulator to the optical transmission line; and
    an optical receiver for receiving the signal transmitted using one of the plurality of beams from remaining terminal stations.

4. A system according to claim 3, wherein said optical transmission line comprises a sending line and a receiving line provided parallel with each other and connected to each other at a folding point of the transmission line, and wherein the beams transmitted in a predetermined direction in the sending line are inputted into the receiving line at the folding point to be transmitted in a direction opposite to said predetermined direction in the receiving line, and said base station and said optical transmitter of said terminal station are connected to the sending line, and said optical receiver thereof is connected to the receiving line.

5. A system according to claim 3, further comprising terminal equipments, respectively connected to said terminal stations, for instructing signal transmission and signal reception.

6. An optical communication network system comprising:
    a base station for generating a plurality of beams having different wavelengths;
    an optical transmission line for transmitting the plurality of beams emitted by said base station; and
    a plurality of optical transmitters/receivers connected to said optical transmission line, each of said optical transmitter/receiver being provided with:

(a) an optical demultiplexing element for partially demultiplexing the plurality of beams from said optical transmission line;

(b) a first wavelength variable filter for selectively extracting a beam having an arbitrary wavelength from the beams demultiplexed by said optical demultiplexing element;

(c) a photosensor for detecting the beam extracted by said first wavelength variable filter;

(d) a second wavelength variable filter connected to said optical transmission line, for separating a beam having an arbitrary wavelength from other beams of the plurality of beams and extracting the separated beam from said optical transmission line;

(e) a signal source for generating a communication signal;

(f) an optical modulator, connected to said signal source, for modulating the beam separated by said second wavelength variable filter in accordance with the communication signal generated by said signal source; and (g) an optical multiplexing element for multiplexing the beam modulated by said optical modulator to said optical transmission line.

7. A system according to claim 6, wherein said each optical transmitter/receiver further comprises a control unit for receiving an output signal from said photosensor and controlling the driving of said optical modulator and said first and second wavelength variable filters.

8. A system according to claim 7, wherein said each optical transmitter/receiver comprises a terminal equipment for instructing signal transmission and signal reception to said control unit.

9. A system according to claim 6, wherein said each optical transmitter/receiver comprises another optical demultiplexing element for partially extracting the beam separated by said second wavelength variable filter and another photosensor for detecting the beam extracted by said another optical demultiplexing element.

10. A system according to claim 6, wherein said transmission line comprises a sending line and a receiving line provided parallel with each other and connected to each other at a folding point of the transmission line, and wherein the beams transmitted in a predetermined direction in the sending line are inputted into the receiving line at the folding point to be transmitted in a direction opposite to said predetermined direction in the receiving line, and said base station being connected to the sending line, said optical demultiplexing element of said optical transmitter/receiver being connected midway along said receiving line, and said second wavelength variable filter thereof being connected to said sending line.

11. An optical communication network system comprising:

a base station for generating a plurality of beams having different wavelengths;

an optical transmission line for transmitting the plurality of beams emitted by said base station; and a plurality of optical transmitters/receivers connected to said optical transmission line, each of said optical transmitter/receiver being provided with:

(a) an optical demultiplexing element for partially demultiplexing the plurality of beams from said optical transmission line;

(b) a first wavelength variable filter for selectively extracting a beam having an arbitrary wavelength from the beams demultiplexed by said optical demultiplexing element;

(c) a photosensor for detecting the beam extracted by said first wavelength variable filter;

(d) an optical line for transmitting the plurality of beams therethrough;

(e) a first optical switch, arranged midway along said transmission line, for selectively guiding the plurality of beams to one of a downstream transmission line and said optical line;

(f) a second wavelength variable filter for separating a beam having an arbitrary wavelength from other beams of the plurality of beams passing through said optical line and for extracting the separated beam from said optical line;

(g) a signal source for generating a transmission signal;

(h) an optical modulator, connected to said signal source, for modulating the beam separated by said second wavelength variable filter, in accordance with the signal generated by said signal source;

(i) an optical multiplexing element for multiplexing the beam modulated by said optical modulator to said optical line; and (j) a second optical switch for returning a beam multiplexed by said multiplexing element to said transmission line.

12. A system according to claim 11, wherein said each optical transmitter/receiver further comprises a control unit for receiving an output signal from said photosensor and controlling the driving of said optical modulator, said first and second wavelength variable filters, and said first and second optical switches.

13. A system according to claim 12, wherein said each optical transmitter/receiver comprises a terminal equipment for instructing signal transmission and signal reception to said control unit.

14. A system according to claim 11, wherein said each optical transmitter/receiver comprises another optical demultiplexing element for partially extracting the beam separated by Said second wavelength variable filter and another photosensor for detecting the beam extracted by said another optical demultiplexing element.

15. A system according to claim 11, wherein said optical transmission line comprises a sending line and a receiving line provided parallel with each other and connected to each other at a folding point of the transmission line, and wherein the beams transmitted in a predetermined direction in the sending line are inputted into the receiving line at the folding point to be transmitted in a direction opposite to said predetermined direction in the receiving line, and said base station being connected to the sending line, said optical demultiplexing element of said optical transmitter/receiver being connected midway along the receiving line, and said first and second optical switches thereof being connected midway along the sending line.

16. An optical transmitter/receiver used in an optical communication network system comprising a base station for emitting a plurality of beams having different wavelengths, an optical transmission line for transmitting the plurality of beams emitted from said base station, and a plurality of optical transmitters/receivers connected to said optical transmission line, comprising:

an optical demultiplexing element for partially demultiplexing the plurality of beams from said optical transmission line;

a first wavelength variable filter for selectively extracting a beam having an arbitrary wavelength from the beams demultiplexed by said optical demultiplexing element;

a photosensor for detecting the beam extracted by said first wavelength variable filter;

a second wavelength variable filter connected to said optical transmission line, for separating a beam having an arbitrary wavelength from other beams of the plurality of beams and extracting the separated beam from said optical transmission line;

a signal source for generating a communication signal;

an optical modulator, connected to said signal source, for modulating the beam separated by said second wavelength variable filter, in accordance with the communication signal generated by said signal source; and an optical multiplexing element for multiplexing the beam modulated by said optical modulator to said optical transmission line.

17. An optical transmitter/receiver according to claim 16, further comprising a control unit for receiving an output signal from said photosensor and controlling the driving of said optical modulator and said first and second wavelength variable filters.

18. An optical transmitter/receiver according to claim 17, further comprising a terminal equipment for instructing signal transmission and signal reception to said control unit.

19. An optical transmitter/receiver according to claim 16, further comprising another optical demultiplexing element for partially extracting the beam separated by said second wavelength variable filter and another photosensor for detecting the beam extracted by said another optical demultiplexing element.

20. An optical transmitter/receiver used in an optical communication network system comprising a base station for emitting a plurality of beams having different wavelengths, an optical transmission line for transmitting the plurality of beams emitted from said base station, and a plurality of optical transmitters/receivers connected to said optical transmission line, comprising:

an optical demultiplexing element for partially demultiplexing the plurality of beams from said optical transmission line;

a first wavelength variable filter for selectively extracting a beam having an arbitrary wavelength from the beams demultiplexed by said optical demultiplexing element;

a photosensor for detecting the beam extracted by said first wavelength variable filter;

an optical line for transmitting the plurality of beams therethrough;

a first optical switch, arranged midway along said transmission line, for selectively guiding the plurality of beams to one of a downstream transmission line and said optical line;

a second wavelength variable filter for selectively separating a beam having an arbitrary wavelength from other beams of the plurality of beams passing through said optical line and for extracting the separated beam from said optical line;

a signal source for generating a communication signal;

an optical modulator, connected to said signal source, for modulating the beam separated by said second wavelength variable filter, in accordance with the communication signal generated by said signal source;

an optical multiplexing element for multiplexing the beam modulated by said optical modulator to said optical line; and a second optical switch for returning a beam multiplexed by said multiplexing element to said transmission line.

21. An optical transmitter/receiver according to claim 20, further comprising a control unit for receiving an output signal from said photosensor and controlling the driving of said optical modulator, said first and second wavelength variable filters, and said first and second optical switches.

22. An optical transmitter/receiver according to claim 21, further comprising a terminal equipment for instructing signal transmission and signal reception to said control unit.

23. An optical transmitter/receiver according to claim 20, further comprising another optical demultiplexing element for partially extracting the beam separated by said second wavelength variable filter and another photosensor for detecting the beam extracted by said another optical demultiplexing element.

24. An optical transmitter used in an optical communication network system comprising a base station for simultaneously emitting a plurality of continuous beams having different wavelengths, an optical transmission line for transmitting the plurality of beams emitted from said base station, an optical transmitter connected to said optical transmission line, and an optical receiver connected to said optical transmission line, comprising:

a wavelength variable filter for selectively separating a beam having an arbitrary wavelength from other beams of the plurality of beams and for extracting the separated beam from said optical transmission line;

a signal source for generating a communication signal;

an optical modulator, connected to said signal source, for modulating the beam separated by said wavelength variable filter, in accordance with the signal generated by said signal source; and an optical multiplexing element for multiplexing the beam modulated by said optical modulator to said optical transmission line.

25. An optical transmitter according to claim 24, further comprising a control unit for controlling the driving of said optical modulator and said wavelength variable filter.

26. An optical transmitter according to claim 25, further comprising a terminal equipment for instructing signal transmission and signal reception to said control unit.

27. An optical transmitter according to claim 24, further comprising another optical demultiplexing element for partially extracting the beam separated by said wavelength variable filter and another photosensor for detecting the beam extracted by said another optical demultiplexing element.

28. An optical transmitter used in an optical communication network system comprising a base station for emitting a plurality of beams having different wavelengths, an optical transmission line for transmitting the plurality of beams emitted from said base station, an optical transmitter connected to said optical transmission line, and an optical receiver connected to said optical transmission line, comprising:

an optical line for transmitting the plurality of beams therethrough;

a first optical switch, arranged midway along said transmission line, for selectively guiding the plurality of beams to one of a downstream transmission line and said optical line;

a wavelength variable filter for selectively separating a beam having an arbitrary wavelength from other beams of the plurality of beams passing through said optical line and for extracting the separated beam from said optical line;

a signal source for generating a transmission signal;

an optical modulator, connected to said signal source, for modulating the beam separated by said wavelength variable filter, in accordance with the communication signal generated by said signal source;

an optical multiplexing element for multiplexing the beam modulated by said optical modulator to said optical line; and a second optical switch for returning a beam multiplexed by said multiplexing element to said transmission line.

29. An optical transmitter according to claim 28, further comprising a control unit for controlling the driving of said optical modulator, said wavelength variable filter, and said first and second optical switches.

30. An optical transmitter according to claim 29, further comprising a terminal equipment for instructing signal transmission and signal reception to said control unit.

31. An optical transmitter according to claim 28, further comprising another optical demultiplexing element for partially extracting the beam separated by said wavelength variable filter and another photosensor for detecting the beam extracted by said another optical demultiplexing element.

32. A method of performing communication using an optical communication network system comprising a base station for simultaneously generating a plurality of continuous beams having different wavelengths, an optical transmission line for transmitting the plurality of beams emitted from said base station, and a plurality of terminal stations connected to said optical transmission line, each of said terminal stations including a signal source for generating a communication signal, an optical transmitter, having a wavelength variable filter and a light beam modulator connected to said signal source, and an optical receiver, comprising the steps of:

selecting a beam of a wavelength not being used in other terminal stations among a plurality of beams received by and using an optical receiver of a first one of said terminal stations;

selectively demultiplexing the selected light beam with the variable wavelength filter of the first terminal station;

modulating the beam selected by said optical receiver of said first terminal station with a light beam modulator of the first terminal station, in accordance with a signal generated by the signal source;

transmitting the modulated light beam from said first terminal station through said optical transmission line; and receiving the signal from said first terminal station with an optical receiver of a second one of said terminal stations.

33. A method of performing communication from a first optical transmitter/receiver to a second optical transmitter/receiver in an optical communication network system comprising a base station for generating a plurality of beams having different wavelengths, an optical transmission line for transmitting the plurality of beams emitted by said base station, and a plurality of optical transmitters/receivers connected to said optical transmission line, each of said optical transmitter/receiver being provided with an optical demultiplexing element for demultiplexing parts of the plurality of beams from said optical transmission line, a first wavelength variable filter for selectively extracting a beam having an arbitrary wavelength from the parts demultiplexed by said optical demultiplexing element, a photosensor for detecting the beam extracted by said first wavelength variable filter, a second wavelength variable filter connected to said optical transmission line, for separating a beam having an arbitrary wavelength from said optical transmission line, a signal source for generating a communication signal, an optical modulator connected to said signal source for modulating the beam separated by said second wavelength variable filter, in accordance with the communication signal generated by said signal source, and an optical multiplexing element for multiplexing the beam modulated by said optical modulator to said optical transmission line, comprising the steps of:

scanning a wavelength range including wavelengths of the plurality of beams with said first wavelength variable filter of said first optical transmitter/receiver;

detecting a beam extracted from said first wavelength variable filter during scanning with said photosensor of said first optical transmitter/receiver, thereby selecting a beam not used in other transmitters/receivers;

extracting the selected beam from said optical transmission line with said second wavelength variable filter of said first transmitter/receiver;

modulating the extracted light in accordance with the communication signal generated by said signal source;

multiplexing the modulated beam to said optical transmission line by said optical multiplexing element of said first optical transmitter/receiver;

extracting the selected beam from said optical transmission line with said first wavelength variable filter of said second optical transmitter/receiver; and detecting the extracted beam with said photosensor of said second optical transmitter/receiver, thereby receiving the signal transmitted from said first optical transmitter/receiver.

34. A method according to claim 33, wherein the step of receiving the signal with said second optical transmitter/receiver comprises the steps of:

scanning a wavelength range including wavelengths of the plurality of beams with said first wavelength variable filter of said second optical transmitter/receiver;

receiving the beam extracted from said first wavelength variable filter during scanning by said photosensor of said second optical transmitter/receiver, thereby detecting the wavelength of the beam selected by said first optical transmitter/receiver;

fixing an extraction wavelength of said first wavelength variable filter to a detected wavelength; and receiving, with said photosensor, the beam extracted by said first wavelength variable filter whose extraction frequency is fixed, thereby receiving the signal transmitted from said first optical transmitter/receiver.

35. A method according to claim 33, wherein said first optical transmitter/receiver adds header information indicating that the signal is directed to said second optical transmitter/receiver, and modulates a beam selected in accordance with the signal added with the header information.

36. An optical communication network system comprising:

an optical transmission line;

a base station, connected to said optical transmission line, for always transmitting at least one reference beam having a predetermined wavelength through said optical transmission line;

an optical transmitter, connected to said optical transmission line, said optical transmitter including a signal source for generating a communication signal, transmission means connected to said signal source for transmitting through said optical transmission line a signal light beam which has a wavelength different from the wavelength of said reference beam and is modulated in accordance with the communication signal generated by said signal source, means for detecting the reference beam, and a control means for controlling the wavelength of said signal light beam in accordance with the wavelength of the reference beam detected by said detection means; and an optical receiver, connected to said optical transmission line, for receiving the signal beam transmitted from said optical transmitter through said optical transmission line.

37. A system according to claim 36, wherein said optical transmitter transmits a signal beam onto said optical transmission line in both directions.

38. A system according to claim 36, wherein said base station transmits two reference beams having different wavelengths through said optical transmission line.

39. A system according to claim 36, further comprising an optical amplifier arranged in said optical transmission line.

40. An optical communication network system comprising:

an optical transmission line;

a base station, connected to said optical transmission line, for transmitting at least one reference beam having a predetermined wavelength through said optical transmission line; and a plurality of optical transmitters/receivers connected to said optical transmission line, each of said optical transmitters/receivers being provided with:

(a) a first optical element for partially demultiplexing beams transmitted through said optical transmission line from said optical transmission line;

(b) a wavelength variable filter for selecting a beam having an arbitrary wavelength from the beams demultiplexed by said first optical element;

(c) a photosensor for detecting the beam extracted by said wavelength variable filter;

(d) a signal source for generating a communication signal;

(e) a light source, connected to said signal source, for generating a signal beam having a wavelength different from that of a reference beam and modulated in accordance with the communication signal generated by said signal source;

(f) a second optical element for outputting the signal light from said light source to said optical transmission line; and (g) a control circuit for controlling an extraction wavelength of said wavelength variable filter to be equal to a wavelength of the reference beam in accordance with an output signal from said photosensor, and for controlling the wavelength of the signal beam emitted from said light source on the basis of a control signal for said wavelength variable filter.

41. A system according to claim 40, wherein the relationship between the control signal input to said light source and the wavelength of the beam emitted from said light source is almost equal to the relationship between the control signal input to said wavelength variable filter and the wavelength of the beam extracted by said wavelength variable filter.

42. A system according to claim 40, wherein said optical transmitter/receiver further comprises an optical demultiplexing element for partially demultiplexing the beams demultiplexed by said first optical element, another wavelength variable filter for selectively extracting a beam having an arbitrary wavelength from the beams demultiplexed by said optical demultiplexing element, and another photosensor for detecting the beam extracted by said another wavelength variable filter.

43. A system according to claim 40, wherein said optical transmitter/receiver comprises another photosensor for partially monitoring the beams emitted from said light source.

44. A system according to claim 40, wherein said optical transmitter/receiver further comprises another light source for emitting another modulated signal beam having a wavelength different from those of the signal beam and the reference beam and modulated differently than the modulated signal beam, and an optical multiplexing element for multiplexing said another modulated signal beam with the signal beam.

45. A system according to claim 40, wherein said second optical element transmits the signal beam along said optical transmission line in both directions.

46. A system according to claim 40, wherein said base station transmits two reference beams having different wavelengths along said optical transmission line.

47. A system according to claim 40, further comprising an optical amplifier arranged in said optical transmission line.

48. A system according to claim 40, wherein said light source and said wavelength variable filter comprise distribution feedback semiconductor elements, respectively.

49. A system according to claim 40, wherein said light source can emit beams having different wavelengths, and wherein said control circuit controls said light source so that the wavelength of the signal beam is set to be a wavelength not used in other optical transmitters/receivers.

50. An optical transmitter/receiver used in an optical communication network system comprising an optical transmission line, a base station, connected to said optical transmission line, for transmitting at least one reference beam having a predetermined wavelength through said optical transmission line, and a plurality of optical transmitters/receivers connected to said optical transmission line, comprising:

a first optical element for partially demultiplexing beams transmitted through said optical transmission line from said optical transmission line;

a wavelength variable filter for selecting a beam having an arbitrary wavelength from the beams demultiplexed by said first optical element;

a photosensor for detecting the beam extracted by said wavelength variable filter;

a signal source for generating a communication signal;

a light source, connected to said signal source, for generating a signal beam having a wavelength different from that of a reference beam and modulated in accordance with the communication signal generated by said signal source;

a second optical element for outputting the signal light from said light source onto said optical transmission line; and a control circuit for controlling an extraction wavelength of said wavelength variable filter to be equal to a wavelength of the reference beam in accordance with an output signal from said photosensor, and for controlling the wavelength of the signal beam emitted from said light source on the basis of a control signal for said wavelength variable filter.

51. An optical transmitter/receiver according to claim 50, wherein a relationship between the control signal input to said light source and the wavelength of the beam emitted from said light source is almost equal to a relationship between the control signal input to said wavelength variable filter and the wavelength of the beam extracted by said wavelength variable filter.

52. An optical transmitter/receiver according to claim 50, further comprising an optical demultiplexing element for partially demultiplexing the beams demultiplexed by said first optical element, another wavelength variable filter for selectively extracting a beam having an arbitrary wavelength from the beams demultiplexed by said optical demultiplexing element, and another photosensor for detecting the beam extracted by said another wavelength variable filter.

53. An optical transmitter/receiver according to claim 50, further comprising another photosensor for partially monitoring the beams emitted from said light source.

54. An optical transmitter/receiver according to claim 50, further comprising another light source for emitting another modulated signal beam having a wavelength different from those of the signal beam and the reference beam and modulated differently than the modulated signal beam, and an optical multiplexing element for multiplexing said another modulated signal beam with the signal beam.

55. An optical transmitter/receiver according to claim 50, wherein said light source and said wavelength variable filter comprise distribution feedback semiconductor elements, respectively.

56. An optical communication network system comprising:

an optical transmission line;

a base station, connected to said optical transmission line, for always transmitting at least one reference beam having a predetermined wavelength through said optical transmission line; and a plurality of optical transmitters/receivers, each of said optical transmitters/receivers being provided with:

(a) a signal source for generating a communication signal;

(b) a light source, connected to said signal source, for transmitting through said optical transmission line a signal beam having a wavelength different from that of the reference beam and modulated in accordance with the communication signal generated by said signal source transmitted;

(c) means for detecting the reference beam; and (d) means for controlling a wavelength of the signal beam emitted from said light source, on the basis of the wavelength detected by said detecting means.

57. A system according to claim 56, wherein said optical transmitter/receiver transmits the signal beam along said optical transmission line in both directions.

58. A system according to claim 56, wherein said base station transmits two reference beams having different wavelengths along said optical transmission line.

59. A system according to claim 56, further comprising an optical amplifier arranged in said optical transmission line.

60. A system according to claim 56, wherein said light source can emit beams having different wavelengths, and said control means controls said light source so that the wavelength of the signal beam is set to be a wavelength not used in other optical transmitters/receivers.

61. An optical transmitter/receiver used in an optical communication network system comprising an optical transmission line, a base station, connected to said optical transmission line, for always transmitting at least one reference beam having a predetermined wavelength through said optical transmission line, and a plurality of optical transmitters/receivers connected to said optical transmission line, comprising:

a light source for transmitting, through said optical transmission line, a modulated signal beam having a wavelength different from that of the reference beam;

means for detecting the reference beam; and means for controlling a wavelength of the signal beam emitted from said light source, on the basis of the wavelength of the detected reference beam.

62. A method of performing communication using an optical communication network system comprising an optical transmission line, a base station, connected to said optical transmission line, for transmitting at least one reference beam having a predetermined wavelength through said optical transmission line, and a plurality of optical transmitters/receivers connected to said optical transmission line, each of said optical transmitters/receivers being provided with a signal source for generating a communication signal, a light source connected to said signal source for transmitting, through said optical transmission line, a signal beam having a wavelength different from that of the reference beam and modulated in accordance with the communication signal generated by said signal source, means for detecting the reference beam, and means for controlling a wavelength of the signal beam emitted from said light source in accordance with the wavelength of the reference beam detected by said detecting means, comprising the steps of:
- detecting a reference beam transmitted from said base station by said detecting means in said optical transmitter/receiver;
- transmitting, from said light source to said optical transmission line, a signal beam having a wavelength different from that of the reference beam and modulated in accordance with the communication signal generated by said signal source; and
- controlling a wavelength of the signal from said light source by said control means on the basis of the wavelength of the reference light beam detected by said detecting means.

63. A method of performing communication from a first optical transmitter/receiver to a second optical transmitter/receiver by using an optical communication network system comprising an optical transmission line, a base station, connected to said optical transmission line, for transmitting at least one reference beam having a predetermined wavelength through said optical transmission line, and a plurality of optical transmitters/receivers connected to said optical transmission line, each of said plurality of optical transmitters/receivers being provided with a first optical element for partially demultiplexing beams transmitted through said optical transmission line from said optical transmission line, a wavelength variable filter for selecting a beam having an arbitrary wavelength from the beams demultiplexed by said first optical element, a photosensor for detecting the beam extracted by said wavelength variable filter, a signal source for generating a communication signal, a light source connected to said signal source for generating a signal beam having a wavelength different from that of a reference beam and modulated in accordance with the communication signal generated by said signal source, a second optical element for outputting the signal light from said light source onto said optical transmission line, and a control circuit for controlling driving of said wavelength variable filter and said light source, comprising the steps of:
- scanning a wavelength range including the wavelength of the reference beam with said wavelength variable filter in said first optical transmitter/receiver;
- detecting the beam extracted by said wavelength variable filter during scanning with said photosensor;
- controlling a filter extraction wavelength to be equal to the wavelength of the reference beam on the basis of an output from said photosensor with said control circuit in said first optical transmitter/receiver;
- calculating a control signal for said light source on the basis of a filter control signal with said control circuit in said first optical transmitter/receiver;
- controlling said light source in said first optical transmitter/receiver by using the calculated control signal and sending the signal light from said light source onto said optical transmission line;
- scanning a wavelength range including the wavelength of the signal light with said wavelength variable filter in said second optical transmitter/receiver;
- detecting the beam extracted from said wavelength filter during scanning by said photosensor in said second optical transmitter/receiver;
- controlling the filter extraction wavelength to be equal to the wavelength of the signal beam on the basis of an output signal from said photosensor with said control circuit in said second optical transmitter/receiver; and
- receiving the signal beam extracted by said filter in said second optical transmitter/receiver with said photosensor, thereby receiving a signal transmitted from said first optical transmitter/receiver.

* * * * *

UNITED STATES PATENT AND TRADEMARK OFFICE
CERTIFICATE OF CORRECTION

PATENT NO. : 5,369,516  
DATED : November 29, 1994  
INVENTOR(S) : Uchida

Page 1 of 2

It is certified that error appears in the above-indentified patent and that said Letters Patent is hereby corrected as shown below:

COLUMN 1:

Line 7, "No. 07/686,378filed" should read --No. 07/686,378 filed--.

COLUMN 3:

Line 1, "communication signal gener-" should read --signal--.
Line 2, should be deleted.
Line 3, "tion network" should be deleted.
Line 5, "signal" should read --communication signal generated by a signal source of the optical communication network--.
Line 19, "communication" should read --a communication--.

COLUMN 12:

Line 38, "said light modulator" should read --said light beam modulator--.
Line 67, "of" should be deleted.

COLUMN 13:

Line 64, "of" should be deleted.

UNITED STATES PATENT AND TRADEMARK OFFICE
CERTIFICATE OF CORRECTION

PATENT NO. : 5,369,516
DATED : November 29, 1994
INVENTOR(S) : Uchida

It is certified that error appears in the above-indentified patent and that said Letters Patent is hereby corrected as shown below:

COLUMN 14:

Line 44, "Said" should read --said--.

COLUMN 18:

Line 12, "of" should be deleted.

Signed and Sealed this

Sixteenth Day of May, 1995

Attest:

BRUCE LEHMAN

*Attesting Officer*      *Commissioner of Patents and Trademarks*